Aug. 27, 1957 R. H. RANGER 2,803,988

SYNCHRONIZED MAGNETIC SOUND RECORDING APPARATUS

Filed May 4, 1951

RICHARD H. RANGER
INVENTOR.

BY Gaylor, Cifelli & Juick
ATTORNEYS

United States Patent Office 2,803,988

Patented Aug. 27, 1957

2,803,988

SYNCHRONIZED MAGNETIC SOUND RECORDING APPARATUS

Richard H. Ranger, Newark, N. J.

Application May 4, 1951, Serial No. 224,625

4 Claims. (Cl. 88—16.2)

This invention relates to magnetic tape recording and more particularly to a novel arrangement for synchronizing the movement of the tape with movement of a motion picture film or other movement requiring accurate coordination.

In my copending United States application Serial No. 84,510, filed March 31, 1949, now Patent No. 2,697,754, I disclose the broad idea of recording a power frequency on the tape, along with the normal sound recording, such power frequency record serving as a subsequent control signal for synchronizing tape movement. In the present invention this principle is used and is further extended to insure a more accurate determination of the relative movements of the magnetic tape and the motion picture film, such that even if the motion picture film movement is not strictly uniform a registry of that fact is established on the magnetic tape to be used subsequently to insure that an accurate coordination of the tape and film movement may rigorously be established and maintained.

Experience has shown that in spite of the sprocket holes used in motion picture technique, absolute synchronism of the motion picture film in the camera is not assured because of the possibility of asynchronous movement of the supposedly synchronous motor driving the motion picture film due to increased friction of the film from time to time, or sticking of this film, or reduced power voltage which does not drive the motor with sufficient torque to maintain true synchronism. Although such deficiencies are rare, they do occur sufficiently often to be very disturbing to the normal procedure of registering sound and picture simultaneously to be used subsequently for redisplay of the scene and sound.

In addition, it is becoming increasingly important to use more than one camera in taking the pictures associated with a single sound track. This invention provides the facility for registering the motion of each camera separately on a single quarter inch tape, and thereby to determine not only true synchronism between their actions, but also the start and stop of each camera which may be brought in and out of action during the continuing sound on the tape.

For the sound recording, as is usual with quarter inch magnetic tape, a gap in an electromagnetic head is arranged transverse to the motion of the tape, such that the tape is magnetized longitudinally in response to the variations in current through the electromagnet head in accordance with the sound pulsations to be registered. In accordance with the principle outlined in my copending application 84,510, a second magnetic recording head is employed to register the power frequency pulses (normally 60 cycles in the United States) as a control reference to be later used as a means of insuring that the tape moves at such a rate that the 60 cycles on the tape will be played back by a similar electromagnetic head placed parallel to the movement of the tape at the same rate as the 60 cycles then being used to project the motion picture film.

The present invention diverges from this plan in two important respects. First, instead of placing the auxiliary control recording magnetic head with its gap longitudinal to the motion of the quarter inch magnetic tape, the gap is inclined slightly, say 10 degrees, to the longitudinal axis of the tape; and secondly, instead of the main power frequency being registered on the tape, the frequency so registered is the exact frequency of the synchronous motor on the camera, whether the motor is running synchronously or asynchronously. In the latter case, the pulses registered on the tape will represent the true speed of the camera motor at all times. Furthermore, in case more than one camera is used, separate signal-recording heads are used for each camera to record distinct, individual synchronizing tracks on the magnetic tape.

It may here be stated that the numerous recordings on the magnetic tape do not interfere with each other in any way. The individual, narrow tracks, representing the synchronizing control signals from each of the cameras, lie in different zones of the magnetizable tape and, therefore, one does not interfere with the other. In addition, the gap of the electromagnetic recording heads employed to record the control frequencies is inclined at an angle to the axis of the tape and the length of such individual gaps, in the direction of tape travel, is made equal to a complete wave length of one cycle of the control frequencies, or an integer thereof. The latter feature, of course, requires that consideration be given to the actual speed of movement of the tape and the actual frequency of the synchronizing signal. For example, if the control signal frequency is 60 cycles and the speed of tape travel is 15 inches per second, a full wave length of the 60 cycle wave will be one-quarter of an inch (15 inches divided by 60). Under such conditions the slight resultant longitudinal magnetism registered on the tape will be completely cancelled out for a transverse gap recording the normal sound on the tape. This feature will be explained in more detail hereinbelow.

An object of this invention is the provision of a precise and highly reliable arrangement for impressing synchronizing signals upon a magnetic tape whereby such signals may be used to establish and maintain an accurate coordination between the movements of the recording tape and a motion picture film.

An object of this invention is the provision of a novel and simple technique for cueing the start of a motion picture film with respect to a tape on which is recorded the normal sound of the scene being filmed.

An object of this invention is the provision of a novel arrangement for cueing a plurality of motion picture cameras operating simultaneously with a sound-recording tape.

An object of this invention is the provision of an arrangement for recording a synchronizing signal on a magnetic tape, such signal having a frequency determined by the actual speed of the motor on a motion picture camera operating simultaneously with the magnetic sound recording apparatus.

An object of this invention is the provision of an arrangement for recording A.-C. synchronizing signals on a magnetic tape, said arrangement including an electromagnetic head operatively associated with the tape, said head having a narrow gap inclined at an angle of approximately 10 degrees to the tape axis and the length of the gap, in the direction of tape motion, being equal to a complete wave length of the A.-C. signal or an integer thereof.

An object of this invention is the provision of a cueing arrangement for a plurality of motion picture cameras and a sound recording tape, said arrangement comprising a magnetic tape recorder including a tape-driving motor, a plurality of signal-recording heads operatively associated with the tape, means associated with the motor of each camera for generating voltage pulses having a frequency directly related to the speed of the camera motor, reactive elements connecting each of the voltage generating means to one of the said signal-recording heads, manually-operable control means for starting the tape-driving motor, selectively-operable means for energizing the camera motors after operation of said control means, and means indicating which camera motors have been energized.

These and other objects and advantages will be apparent from the following description when taken with the accompanying drawings illustrating my invention. The drawings are for purposes of description and are not to be construed as defining the scope or limits of the invention, reference being had for the latter purpose to the appended claims.

In the drawings wherein like reference characters denote like parts in the several views.

As stated hereinabove, the invention disclosed in my copending application Serial No. 84,510, now Patent No. 2,697,754, is based upon the use of a vertical gap, relative to the tape, in the electromagnetic head that records the normal sound and a strictly longitudinal gap in the electromagnetic head that records the control or synchronizing frequency. It has been found in practice, however, that with slight variations in the width of the conventional one-quarter inch tape, used normally in magnetic recording, there is a possibility that the tape will weave up and down with respect to its normal horizontal movement and, consequently, the synchronizing traces may not register exactly with such longitudinal gap in the synchronizing playback head. To overcome this possible source of difficulty the present invention contemplates impressing such signal traces at an angle on the magnetic tape. The actual magnetic trace is, of course, recorded on the tape at right angles to the oblique gap in the recording head, as is well known in this art. Such tilting of the recorded signal trace may be either upward or downward from left to right but once it has been established it is essential that it continue to be used for the playback as well as the recording so that playback may be given full advantage of the trace angularity.

Figure 1:
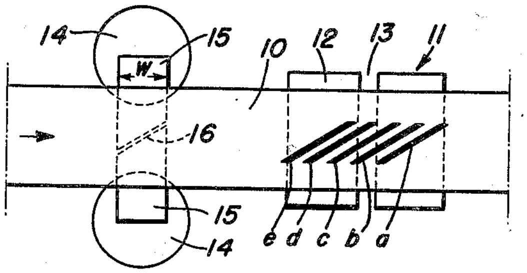
Figure 1 is a plan view illustrating a magnetizable recording tape with a normal sound-playback head and my novel control signal-recording head operatively associated with such tape.

Reference is now made to Figure 1 wherein there is shown a magnetizable tape 10 movable in the direction indicated by the arrow thereon. A conventional playback head 11, having a gap 13 disposed transversely relative to the tape, is shown in operative position in back of the tape. As is well known such playback head comprises one or more coils (not shown) carried by a paramagnetic yoke 12 having a narrow gap 13 therein. My novel signal-recording head is shown as comprising the coils 14 mounted on a paramagnetic yoke 15 that includes the oblique gap 16 therein. The signal voltage is employed to energize the coils 14 and the variations in the current flowing in the coils establishes a correspondingly-varying magnetic flux across the gap 16, which flux variations are registered on the magnetizable tape. Because of the angular disposition of the gap 16, relative to the tape axis, advancement of the tape results in successive magnetic traces *a*, *b*, *c*, *d*, and *e* registered on the tape in a shingled manner, as shown. It will be apparent the succession of signal traces will continue lengthwise of the tape as long as the signal voltage is impressed on the coils 14 of the signal-recording head. However, in the interest of clarity, the five traces shown in the drawing are sufficient to convey a thorough understanding of the invention.

Figure 2:
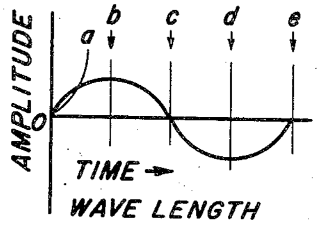
Figure 2 represents one full wave length of the synchronizing signal and is presented to illustrate the summation of the transverse components of the magnetic traces impressed upon the tape by a signal-recording head having a gap inclined with respect to the tape axis, as shown in Figure 1.
Figure 3:
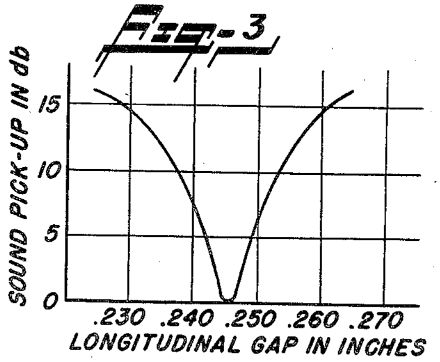
Figure 3 is a curve showing the cancellation effect of the signal traces, recorded on the tape at an inclined angle, on a playback head having a transverse gap of specified longitudinal length.

Figure 2 represents the summation of the transverse components of the magnetic traces *a* to *e*, inclusive, shown in Figure 1, as these traces cross the vertical gap 13 at a given instant. It is assumed that the trace *a* is just leaving the gap as the trace *e* is entering the gap. The trace *a* is also assumed to be the portion of the tape which was at the gap 16, in the synchronous recorder head, when the signal current was zero and, therefore, there is no horizontal magnetic component generated by its passage over the gap 13 in the playback head 11. The trace *b*, however, will represent the maximum amplitude of one half wave of the A.-C. signal voltage. Likewise, the trace *c* will be zero, the trace *d* a maximum corresponding to the other half wave of the signal frequency, and trace *e* will also be zero. The summation of all these wave traces, taken at any instant across the vertical gap 13 is zero, provided everything works out as here indicated and provided the effective length of the individual traces is such that one complete cycle of the signal frequency, as represented by Figure 2, is exactly 360 degrees. Actually, in practice, I have found that this is not exactly true if the length of the gap 16 in the recording head, in a horizontal direction, is exactly equal to a wave length of the signal frequency. There appears to be a slight extension to the magnetic field such that the effective registration of the gap length on the tape, in a horizontal direction, is slightly greater than the actual horizontal width of the paramagnetic yoke 15 of the recording head. Figure 3 is a curve illustrating the cancellation effect of the control signal traces on a playback head for various longitudinal gap lengths in the yoke 15 of the signal recording head. A 60 cycle signal frequency was employed, which, mathematically, calls for a gap length of .250 inch. However, it will be noted that complete cancellation of the signal traces occurred when such gap has an actual length somewhat less than .250 inch. The optimum gap length was found to be .2455 inch. Once again it is pointed out that the gap length under discussion is taken parallel to the motion of the tape, that is, the width of the yoke 15 as indicated by the dimension W in Figure 1. Since the optimum gap length is .2455 rather than .250 inch, it is clear that a 2 percent elongation occurs due to the stray fields at the ends of the gap. Having determined the error factor it is now apparent the calculation of the proper speed of tape travel and longitudinal gap length can be made for any predetermined frequency of the synchronizing signal. Actually, the signal-to-noise ratio of the synchronizing signal impressed on the tape, as compared to the normal full modulation of the normal audio record carried by the tape, and as picked up by the gap 13 of the playback head 11, is found to be down to the order of minus 60 db. However, it is seen from Figure 3 that a change in longitudinal gap length of 10 thousandths of an inch would increase this cross talk by approximately 10 db. Maintaining a gap length to within a few thousandths of an inch presents no problem even when using modern mass production methods. It will be apparent a gap length of NW (where N is a whole number) will accomplish the same purpose. When the recording-reproducing apparatus is of the two speed type, that is, having a tape speed of 15 or 7½ inches per second, a gap length of one wave length at the higher speed will provide a signal trace of two wave lengths at the half speed, which likewise results in the cancellation effect.

Figure 4:
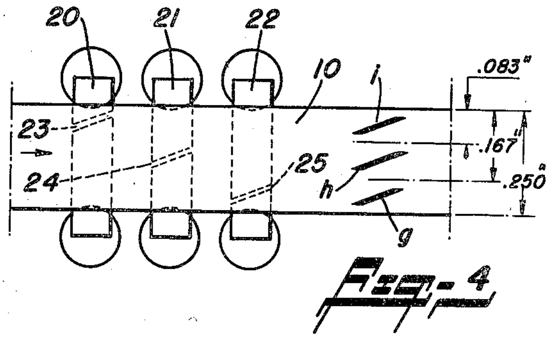
Figure 4 is somewhat similar to Figure 1 and showing the relative disposition of three control signal recording heads to impress individual control frequencies on different zones of the tape.

A very useful adaptation of this novel method of recording the synchronizing signal comes about when more than one control signal is desired on a single tape, as for the operation of more than one camera wth a separate control signal assigned to each camera. Such an arrangement is shown in Figure 4 wherein the three synchronizing record heads 20, 21, 22 have their respective, tilted gaps 23, 24, 25, occupying distinct areas relative to the tape width. The gap 24 is centered relative to the tape width whereas the gaps 23 and 25 have their center one twenty fourth of an inch in from the proximate edge of the tape. If the tape is of the standard one quarter inch width and the gaps are inclined at an angle of 10 degrees to the axis of the tape 10, horizontal projection of each of the traces *g*, *h*, *i*, corresponds to a vertical space factor found by multiplying the tangent of 10 degrees by ¼ inch, or 44 thousandths of an inch. This is well within reason as an appropriate path separation between the three distinct traces with no cross interference of one channel on the other. While I have shown the three synchronizing signal heads having the oblique gap positioned at different points in the individual yokes, it may be better manufacturing economy to make all such heads identical. In such case the heads would be spaced laterally relative to the tape so that the individual gaps would, again, occupy the positions shown in Figure 4 relative to the tape. Also, it will be apparent that the gap in the yokes can be cut normal to the length of the yoke in which case the yokes themselves (and in fact the signal-recording head as a whole) can be disposed angularly relative to the tape axis to provide the required angular disposition of the air gap. The dimensions given at the right of the tape in Figure 3 define the three vertical zones within which the signal traces *g*, *h* and *i* are impressed. Specifically, the upper zone extends from 0 to 83 mils, the center zone from 83 to 167 mils and the lower zone from 167 to 250 mils. Each of the traces will occupy a width of 44 mils of the 83 mil zone width assigned to it. Although I refer to the magnetizable tape as a quarter inch tape, in accordance with accepted practice, the tape width actually varies from .246 to .248 inch. Obviously, this factor should be taken into consideration in determining the individual zones occupied by the signal traces of each signal recorder head.

Having now described the recording of one or more synchronizing signals on the tape it should here be stated othat on play back the synchronizing playback head, or heads, will have inclined gaps corresponding exactly to the inclined gaps of the recording heads. When a straight longitudinal gap is employed in the synchronizing recording and playback heads, as disclosed in my copending application 84,510, experience has shown that the narrow, longitudinal gap requires very close control of the transverse movement of the tape with repsect to the heads, both in recording and playback to be sure that the control signal as recorded on the tape is picked up properly on playback. With the tilting of the gap by a matter of some 10 degrees, as hereinabove described, a wider swathe is recorded on the tape and sidewise motion of the tape has, therefore, a much diminished effect on the output strength of the control signal on playback. Also, this method of recording the control traces gives rise to a stronger net playback signal due to the fact that the tape moves itself out of the way very rapidly as it cuts across the angled gap and gives rise to shingled magnetic layers on the tape, which layers transfer their effect back neatly on the tilted gap of the playback head.

A practical arrangement for cueing a plurality of motion picture cameras on a single tape will now be described. In such arrangement it is desirable to provide means to start the recording tape and the cameras in a smoothly coordinated manner. Such control means should include, preferably, a single button control whereby the crew man, normally the assistant camera man, can start the tape recorder, condition all cameras for local control by the assigned camera man, and should include means for indicating the condition of the cameras and which of the cameras is actually in operation. Another important feature of my novel arrangement comprises the provision of individual pulse-generating means associated with each camera. This means comprises a source of direct current connected to a small commutator that is driven by the camera motor. Such commutator makes and breaks the electrical circuit twice per revolution of the synchronous camera motor operating at 1800 R. P. M. and thus will produce 60 cycle pulses when the camera motor is operating at true synchronous speed. Obviously, if the camera motor runs at less than 1800 R. P. M., for any reason, the commutator-generated pulse will likewise decrease proportionately in frequency. Since the commutated pulses are impressed upon the signal recording head associated with the particular camera, the recorded signal will likewise be modified to give a true picture of the camera motor speed. Reactances are employed in the electrical circuit to provide a substantially sinusoidal wave form in the commutated circuit.

The fact that the control signal from the commutator on the camera motors obviously can only start when the cameras start rolling gives a very direct indication, on the recorder tape, of the time of the start of each of the camera motors. This in effect acts in place of the normally used "clapsticks" used to identify the start of takes on the sound and picture records. Therefore, this invention promotes a very accurate means of cueing the start of the picture takes by the use of this control signal, starting only when the camera starts. The modern camera motor starts very quickly, in fact my tests indicate that the camera motor is up to synchronous speed in about one-tenth of a revolution. Although it may oscillate slightly back and forth about the mean synchronous position, it is up to this synchronous speed after this very brief time interval and then the control signals simultaneously registered on the tape give a very true picture of such slight oscillation of the camera motor as may occur.

As previously suggested, the control means functions in such a manner, that the tape starts its movement first and therefore comes up to smooth normal speed before the cameras start. The first frame photographed by a camera is very readily identified from what preceded, primarily due to the fact that the scene changes. Also, as a camera slows down there is an increased exposure so that the previous take will be separable from the new take by merely observing the increased exposure of the tail end of the previous take as compared with the clean cut normal exposure of the new take. Likewise, it is to be recommended that a slate indicating the number of the scene and take be used, as is normal, and shown in the first frames of the new take. This then identifies the new take very positively and the new take is announced as well on the microphone so that this also gives a normal sound cue on the tape for each scene.

Figure 5:
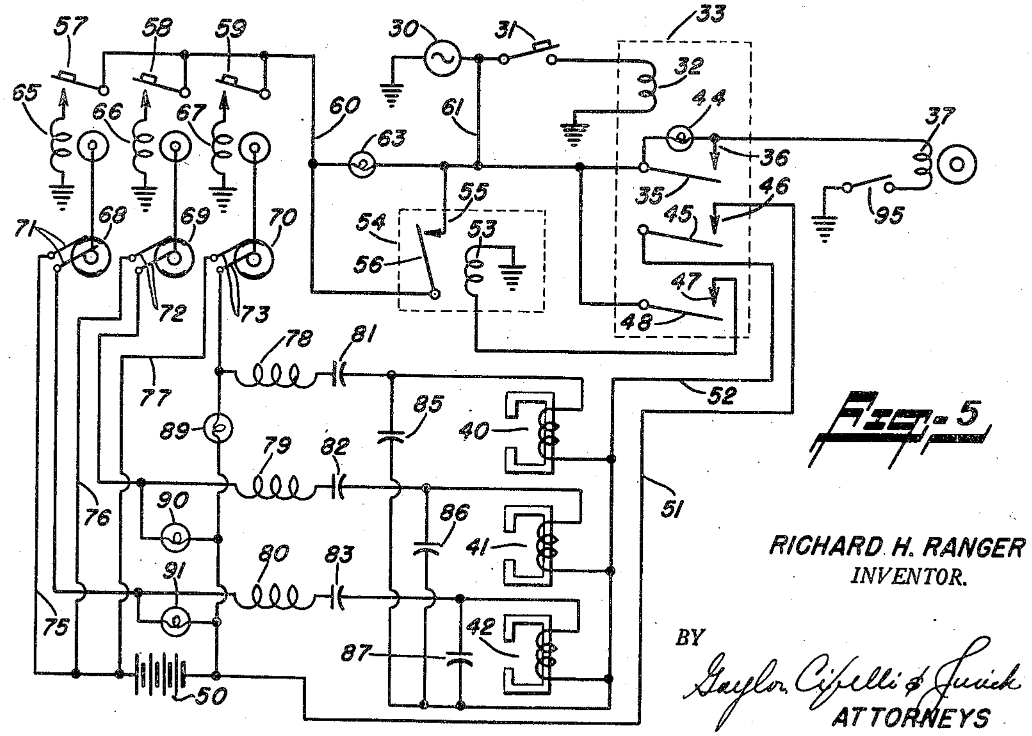
Figure 5 is a diagrammatic representation and wiring diagram of an arrangement for cueing a plurality of motion picture cameras to a single sound recording tape.

Reference is now made to Figure 5. Power for the various components is obtained from a conventional A.-C. source 30 having one side grounded and the other side connected to a hand-operated master control switch 31. Closure of the switch 31 energizes the operating coil 32 of the relay 33 having three movable contacts independently cooperating with associated stationary contacts. These contact sets are of the normally-open type and close only when the operating coil 32 is energized. Closure of the relay contacts 35, 36 energizes the motor 37 that drives the magnetizable tape of the recorder. The recording apparatus has been conditioned in advance and closure of the contacts 35, 36 starts the tape drive to pull the tape past the normal erase and recording heads. The normal sound recording head is not shown but there are shown three separate synchronizing signal recording heads 40, 41 and 42, each such head being associated with a specific motion picture camera and each head capable of registering distinct signal traces on the recorder tape as explained with reference to Figure 4. The signal lamp 44, connected across the contacts 35, 36 serves as a signal indicating that the switch 95 of the recorder motor 37 is closed. If the lamp remains energized when the master switch 31 is closed the operator will know that the relay contacts 35, 36 have not closed and, consequently, the tape-driving motor, which is located at a point remote from the control switch and relay, is not running.

Energization of the relay coil 32 also closes the co-operating contacts 45, 46 and 47, 48. Closure of the contacts 45, 46 connects one side of each of the coils of the recording heads 40, 41, 42 to a source of D.-C. current 50, through the wires 51 and 52. Closure of the contacts 47, 48 energizes the operating coil 53 of a time delay relay 54 adjusted to close its contacts 55, 56 approximately two seconds after energization of the operating coil. When the time delay relay contacts close each of the hand-operated switches 57, 58 and 59 are connected to the live side of the power supply 30 through the wires 60, 61. The signal lamp 63 will glow when the contacts 55, 56 are open and will go out when these contacts close, as is apparent.

The switches 57, 58 and 59 control the operation of the individual camera motors 65, 66, 67. Connected directly to the shafts of the camera motors are the commutators 68, 69 and 70, each commutator having a set of brushes 71, 72, 73, respectively, associated therewith. The commutators will make and break the circuit between the associated brushes twice per revolution of the commutator. Inasmuch as the camera motors are assumed to be synchronous motors operating on 60 cycles, they will normally rotate at 1800 R. P. M. or 30 R. P. S. Consequently, the circuit between the commutator brushes will make and brake 60 times per second. It may here be pointed out that one brush of each set is connected to the D.-C. source 50 by the wires 75, 76 and 77, while the other brushes are individually connected to the recording heads 40, 41 and 42 through the individual inductances 78, 79, 80 and condensers 81, 82 and 83. As already explained, the recording heads are connected to the other side of the D.-C. source 50 when the contacts 45, 46 of the relay 33 are closed. Therefore, rotation of the individual camera motors impresses pulsating current upon the coils of the recording heads, such pulsations being of substantially sinusoidal wave form by reason of the tuned filter networks comprising the series inductances 78—80, series capacitors 81—83 and the shunting condensers 85, 86 and 87. When designed for a frequency of 60 cycles per second the inductances 78—80 will have a value of about 13 henries, the series capacitors 81—83 will have a value of about 1 mfd. and the shunting capacitors 85—87 will have a value of about 8 mfds., these values constituting practical values for recording heads having conventional coils.

The sinusoidal pulses impressed upon the coils of the signal recording heads will have a frequency of exactly 60 cycles per second when the camera motors run at true synchronous speed. Actually, these motors occasionally vary in speed due to sticking of the motion picture film, friction of the operating gearing and other movable parts, reduction in the applied voltage, etc. Although such speed variations are infrequent they do occur, but when such changes occur the signal frequency (commutator pulses) change proportionately and, therefore, the signal registered on the recording tape will likewise be modified to give a true picture of the camera speed. Further, since each camera produces its own signal frequency on the tape, it is a simple matter to determine which camera has deviated from normal speed, when such deviation occurred and how long it lasted. While I have described a commutator and battery arrangement for providing the signal voltages, those skilled in this art will understand such signal voltages can be obtained by means of a small A.-C. generator having its armature shaft coupled to the shaft of the associated camera motor.

In practice it is usual for one member of the camera crew to close the hand switch 31 that is usually on a cord. The sound man operates the tape recorder and sees to it that it is ready at all times for operation when the camera crew starts operations. The director is usually very close to the camera men and he readily may communicate with the individual in charge of the master control switch 31. When all matters meet the satisfaction of the director he signals for the closure of the switch 31. As soon as this switch is closed the lamp 44 goes out indicating the remotely-located tape recorder has started. The lamp 63 remains lighted until the time delay relay 54 closes which is approximately two seconds after the closure of the main control switch 31. The assistant camera man will note that the appropriate lamps 89, 90, 91 are energized, depending upon which cameras have been set into operation by closure of the individual switches 57, 58, 59 by the camera men assigned to the specific cameras. If it is to be a long take and one, two or three cameras are to be used jointly or in succession, this can all be worked out by camera men the instant their cues indicate their cameras should be operating. As soon as the camera men close the switches 57, 58, 59 the corresponding commutators 68, 69, 70 go into operation registering the start of the control signal on the recorder tape. Obviously, all three cameras can be started simultaneously if the individual switches 57, 58, 59 are closed prior to the closure of the main switch 31 by the operator. The control signals are registered on the recording tape in different zones that divide the tape into three vertical sections, as already explained.

On playback, a similar set of three separate heads is used on the playback machine which, actually, may be the same machine used for the recording operation. The playback heads are connected to suitable amplifiers having suitable indicating and/or audible devices in the output circuits, such as ocilloscope, indicating instruments, headphones, etc. In my above-identified copending application I show means by which a control signal will operate to hold the tape in strict synchronism with the 60 cycles being used to operate the motion picture equipment such as a projector, film re-recorder or whatever is being operated cojointly with the tape recorder on playback. This same means can be used with the tilted signal traces described herein.

By use of the apparatus and technique herein described much confusion in taking sound and pictures on location is avoided and a very compact device is provided by means of which the film editors may readily determine the cueing of the sound takes with the picture in much the normal manner practiced in motion picture techniques.

It will be apparent that the control signals, as registered on the tape, may be re-recorded on film at the same time that the sound track is re-recorded from the tape to the film. All that is here necessary is to have small electric bulbs operated by the amplifiers that pick up the control signals from the tape. The amplifier output will be sufficiently strong to energize such lamps and expose the film at the appropriate times corresponding to the initiation of the camera takes for each of the three cameras. Thus, if editing is to be done in the conventional manner of film for the sound and film for the picture, this technique will bring the whole operation back to the usual method. However, the editing of tapes direct to picture film is being advanced as this eliminates the intermediate stage. As this modern technique grows, the re-recording of the tape to film sound will be eliminated except for the final edited version. It is thus seen that all of these techniques lead to a simplification and improvement in the operation of recording sound for motion pictures.

Having now described my invention in detail in accordance with the Patent Statutes those skilled in this art will have no difficulty in making certain changes and modifications to meet specific conditions. It will be understood such changes and modifications can be made without departing from the spirit and scope of the invention as recited in the following claims.

I claim:

1. In an arrangement for recording normal-sound and an alternating current control signal on a magnetizable tape, the improvement wherein the normal-sound recording head has an air gap oriented at a right angle to the axis of the tape, and the control-signal recording head has an air gap oriented at an angle of approximately 10 degrees to the axis of the tape and a length in the direction of tape travel that is substantially equal to the distance of tape travel for one full cycle of the control signal multiplied by an integer, the said control-signal recording head being so disposed relative to the tape as to superpose the control signal over the normal-sound track.

2. The invention as recited in claim 1, wherein the length of the air gap of the control-signal recording head is approximately equal to 98 percent of the distance of tape travel for one full cycle of the control signal.

3. In a combination for making a sound motion picture film and of the type wherein the scene is photographed on a film by means of a camera driven by a constant speed motor and the related sound track is registered on a tape recorder having a normal-sound recording head operatively associated with a surface of the tape moving at a constant speed; the arrangement wherein the normal-sound recording head has an air gap oriented at a right angle to the axis of the tape; means providing a cyclically-varying control signal the frequency of which is related to the speed of the camera motor; a control-signal recording head operatively associated with the tape in a manner such as to superpose a control signal track over the normal-sound track, said control signal recording head having an air gap that is oriented at an angle of substantially 10 degrees to the axis of the tape and a length in the direction of tape travel that is substantially equal to the distance of tape travel for one full cycle of the control signal; and means impressing the control signal on the said control signal recording head.

4. The invention as recited in claim 3, wherein the said length of the air gap of the control-signal recording head is approximately equal to 98 percent of the distance of tape travel for one full cycle of the control signal.

References Cited in the file of this patent

UNITED STATES PATENTS

| | | |
|---|---|---|
| 1,210,323 | Janssens | Dec. 26, 1916 |
| 1,877,731 | Kuchenmeister | Sept. 13, 1932 |
| 1,950,091 | Owens | Mar. 6, 1934 |
| 2,208,404 | Aalberg | July 16, 1940 |
| 2,272,821 | Roys | Feb. 10, 1942 |
| 2,378,611 | Westerkamp | June 19, 1945 |
| 2,475,439 | Waller | July 5, 1949 |
| 2,496,047 | Goddard | Jan. 31, 1950 |
| 2,503,083 | Waller | Apr. 4, 1950 |
| 2,679,187 | Bitting | May 25, 1954 |
| 2,712,572 | Roberts | July 5, 1955 |

FOREIGN PATENTS

| | | |
|---|---|---|
| 478,481 | Great Britain | Jan. 19, 1938 |
| 956,447 | France | Aug. 8, 1949 |
| 594,991 | Germany | Mar. 24, 1934 |